United States Patent [19]

Braunschweig

[11] 4,189,040
[45] Feb. 19, 1980

[54] HELICAL SPRING CLUTCH

[75] Inventor: Orlen O. Braunschweig, Reeseville, Wis.

[73] Assignee: Briggs & Stratton Corporation, Wauwatosa, Wis.

[21] Appl. No.: 857,307

[22] Filed: Dec. 5, 1977

[51] Int. Cl.² .................................... F16D 13/08
[52] U.S. Cl. .................................... 192/26; 74/15.63; 192/36; 192/81 C
[58] Field of Search .................. 192/26, 35, 36, 81 C; 74/15.63

[56] References Cited

U.S. PATENT DOCUMENTS

| | | | |
|---|---|---|---|
| 2,551,739 | 5/1951 | Harlan | 192/81 C |
| 3,425,526 | 2/1969 | Baer | 192/36 X |
| 3,637,056 | 1/1972 | Baer | 192/35 X |
| 3,648,810 | 3/1972 | Weatherby | 192/26 |
| 3,987,880 | 10/1976 | Letz et al. | 192/36 |

Primary Examiner—Allan D. Herrmann
Attorney, Agent, or Firm—Ira Milton Jones

[57] ABSTRACT

A normally disengaged helical spring clutch in which a connection between the control sleeve and the endmost one of the coils of the spring that encircle the hub of the driven element prevents that endmost coil from contacting any part of the driven element when the clutch is disengaged, and in which a reduction in diameter of the end portion of the hub of the driving element brings about a more effective torque transmitting connection between the driving and driven elements when the clutch is engaged and, by the same token, increases the shape-restoring force in the coils of the spring that encircle the contiguous end portions of the hubs, and thereby assures rapid and positive disengagement of the spring from the hub of the driven element.

2 Claims, 3 Drawing Figures

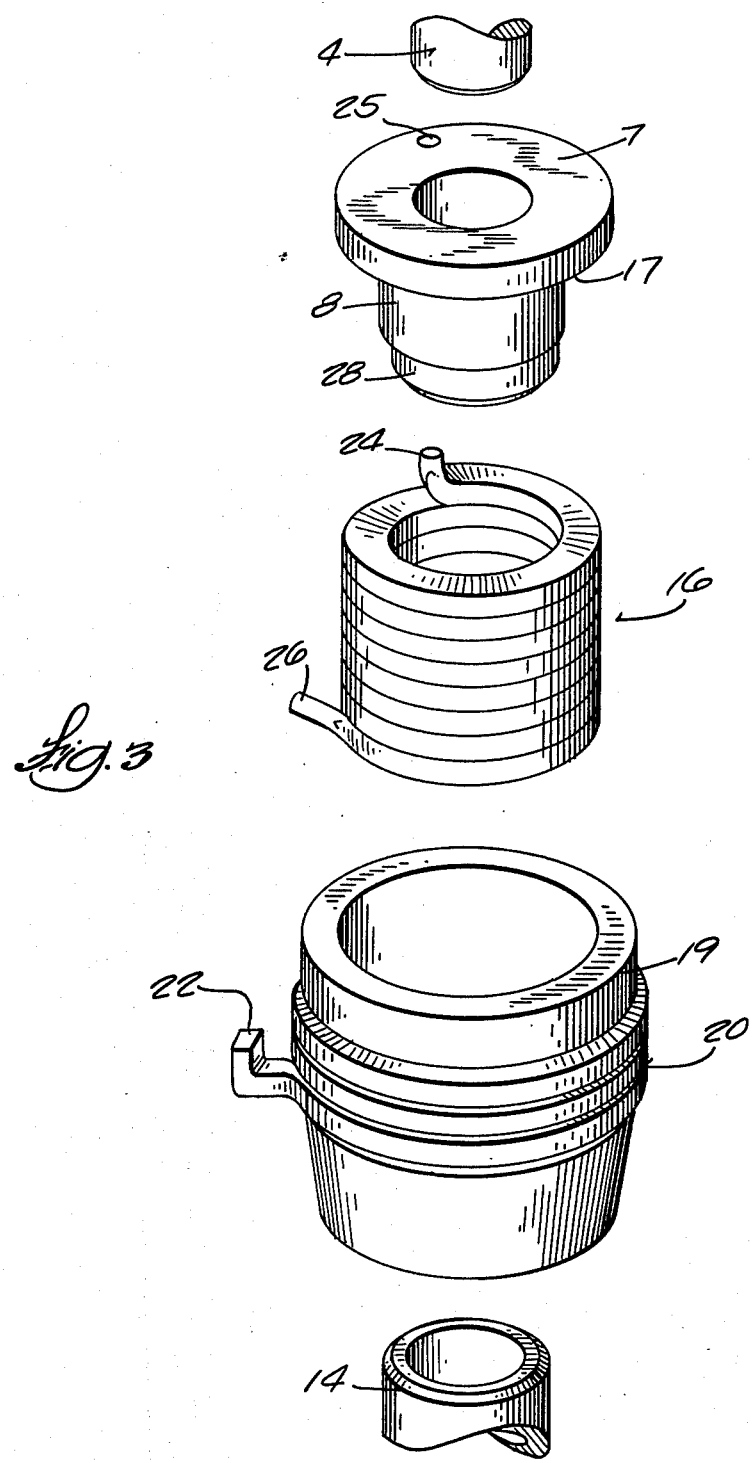

HELICAL SPRING CLUTCH

This invention relates to a clutch of the helical spring type, wherein torque is transmitted from a rotary driving element to a rotatable driven element by means of a helical spring that encircles end-to-end hubs on the driving and driven elements.

In the normally disengaged version of such clutches to which this invention specifically appertains, the spring at all times grips the hub of the driving element and is caused to grip the hub of the driven element for engagement of the clutch. It is obvious, therefore, that if the spring fails to disengage itself from the driven hub when it should, the clutch is not reliable, to say the least. In fact, a clutch that will not—or, at unpredictable times, will not—disengage, constitutes a serious safety hazard.

It is the purpose of this invention to eliminate that hazard by removing the cause of the failure of the spring to disengage itself from the driven hub when the clutch control means is actuated to effect disengagement of the clutch.

The prior art is replete with patents covering different embodiments of helical spring clutches. Representative examples of those patents are the following:

Lowery—U.S. Pat. Nos. 3,990,554 and 3,844,390
Malion et al—U.S. Pat. No. 3,837,450
Baer et al—U.S. Pat. No. 3,726,372
Weatherby—U.S. Pat. Nos. 3,648,810 and 3,521,730
Baer—U.S. Pat. Nos. 3,642,106; 3,637,056; 3,465,857; 3,425,526; 3,373,851; 3,349,880
Kunde et al—U.S. Pat. No. 3,181,669
Hoff—U.S. Pat. No. 3,493,088
Tomko et al—U.S. Pat. No. 2,984,325
Hungerford, Jr. et al—U.S. Pat. No. 2,951,568
Sacchini et al—U.S. Pat. No. 2,829,748

Despite the wealth of knowledge contained in the disclosures of these patents, a solution to the problem with which this invention is concerned is not to be found therein. Nor do any of them even evidence a recognition of the existence of the problem.

In the adaptation of a helical spring clutch to the power take-off device that forms the subject matter of the Catterson et al application, Ser. No. 848,344, filed Jan. 31, 1978 which—like the instant invention—is assigned to Briggs & Stratton Corporation, difficulty was experienced in getting the clutch to disengage. Engagement of the clutch presented no problem, but time and again the clutch spring would not release itself from the driven element of the clutch.

It was not until the herein described combination of structural modifications were incorporated in the helical spring clutch employed in that power take-off that reliable disengagement was achieved.

The structural environment of that power take-off is such that for the clutch to fit into the available space, the endmost coils of its spring must be directly contiguous to opposing shoulders on the remote ends of the hubs encircled by the spring. Being a normally disengaged clutch, the spring must grip the driving hub but be clear of any contact with the driven element of the clutch until the clutch is intentionally engaged. This is done by restraining free rotation of the control sleeve that encircles the spring, and as a corollary, disengagement of the clutch should take place when the control sleeve is relieved of that restraint.

As already noted, engagement of the clutch embodied in the Catterson et al power take-off presented no problem, but reliable disengagement was not achieved until—in accordance with this invention—the clutch was modified to incorporate: a radially outwardly protruding tang on the endmost of the coils of the spring that encircle the hub of the driven element, projecting into a radially oriented hole in the control sleeve, so that said endmost coil of the spring is not only held against angular displacement with respect to the control sleeve to assure contraction of the spring into torque transmitting gripping engagement with both hubs when the control sleeve is restrained against free rotation with the driving element, but is also prevented from contacting the adjacent shoulder on the driven element; a tang protruding axially from the endmost of the coils of the spring that encircle the hub of the driving element, projecting into an axially oriented hole in the adjacent shoulder on the driving element to prevent relative rotation between the spring and the hub of the driving element and thereby eliminate any tendency for the spring to creep towards the driven element; and a reduction in the diameter of the outer end portion of the hub of the driving element to the smaller diameter of the hub of the driven element, so that the force with which the coils of the spring encircling the contiguous end portions of the hubs grip the same is increased during engagement of the clutch and the shape-restoring force in the spring is augmented and rendered more effective to disengage the spring from the driven element upon removal of the restraint against rotation of the control sleeve.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 3 is an exploded perspective view of the essential components of the clutch.

Figure 1:
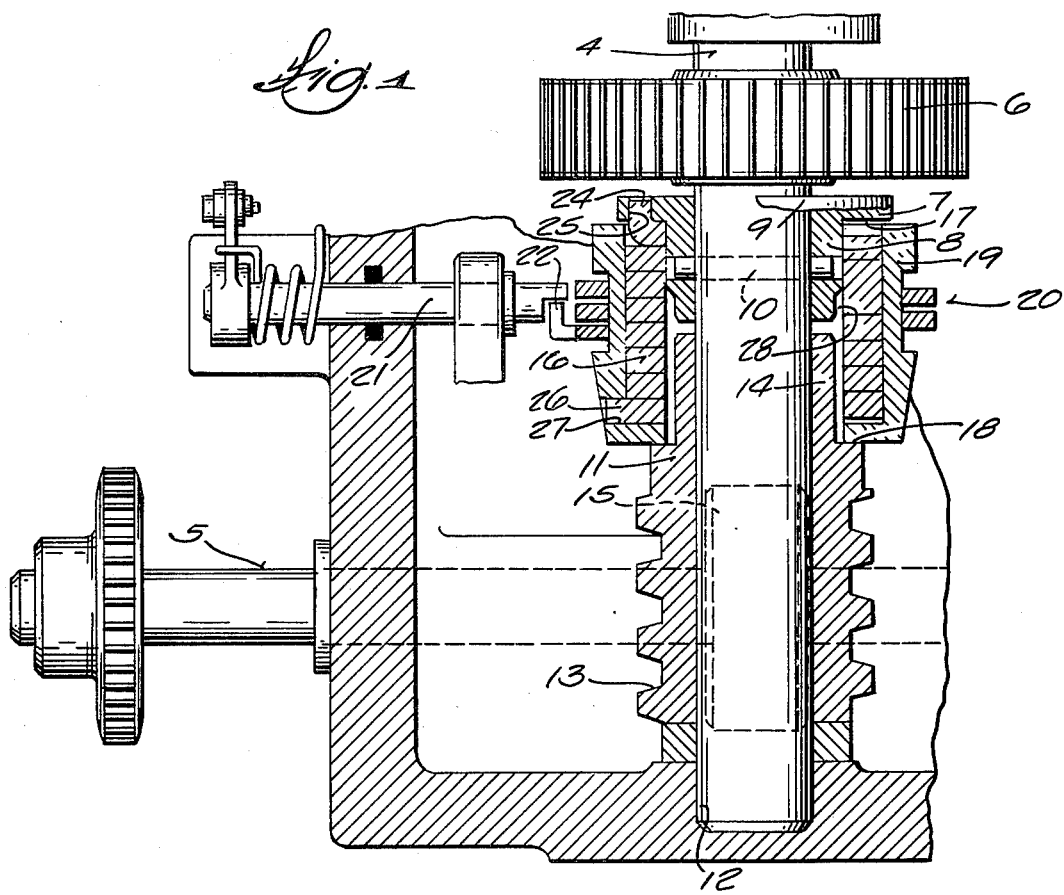
FIG. 1 is a vertical sectional view through the portion of an engine in which an auxiliary power take-off shaft is located, and specifically the part thereof directly associated with the clutch through which torque is transmitted to the power take-off shaft, showing the clutch disengaged.
Figure 2:
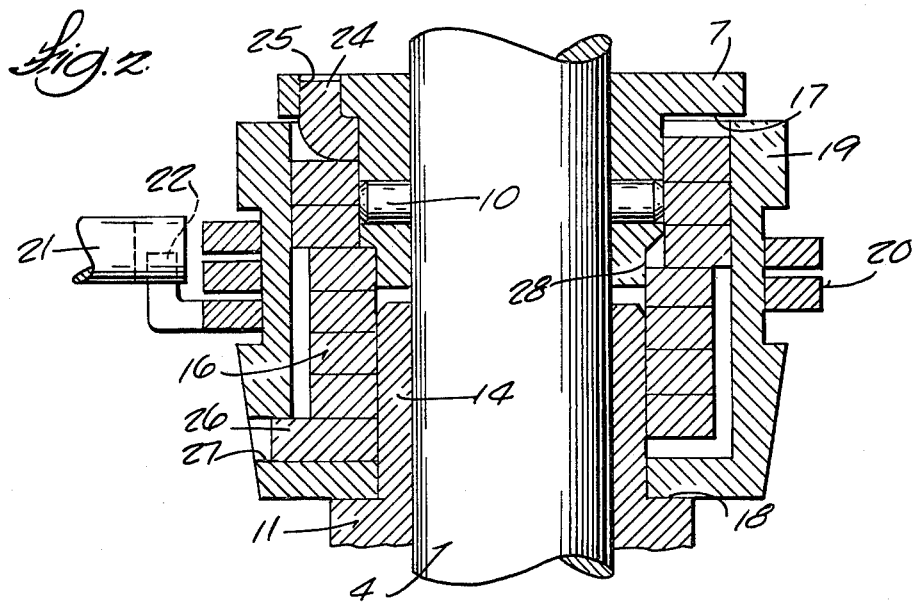
FIG. 2 is an enlarged detail view of the contiguous portion of the driving and driven hubs of the clutch and the adjacent portions of the clutch spring, showing the disposition of the latter during the engaged condition of the clutch.

Referring to the drawings, the numeral 4 designates the camshaft of a single cylinder vertical shaft internal combustion engine of the type widely used to power lawn mowers. Engines destined for use on self-propelled walk-behind power lawn mowers have a power take-off shaft 5 that protrudes from the crankcase. Prior to the Catterson et al invention disclosed in the above identified patent application, the power take-off shaft was continuously driven and was selectively drivingly connected with the traction wheels of the mower, usually by belt tightening manipulation of an idler pulley.

The Catterson et al invention placed the clutch inside the engine between a vertically oriented shaft of the engine, preferably the camshaft, and the horizontally oriented power take-off shaft. While that location of the clutch did not necessarily require that the clutch be of the helical spring type, it strongly recommended that form of clutch, especially since the clutch had to be fitted into a rather crowded space in order to avoid costly modification to the engine design. Those considerations led to the placement of the clutch on the camshaft below its timing gear 6.

The driving element 7 of the clutch, which consists of a hub 8 with a flange 9 at its upper end, is fixed to the camshaft, as by a roll pin 10. The driven element 11 of the clutch is freely rotatably mounted on the camshaft between the driving element and the lower camshaft bearing 12. The driven element consists of a worm 13 and a hub 14 integral therewith and projecting axially from its upper end.

The worm 13 meshes with a helical gear 15 that is fixed to the horizontally oriented power take-off shaft 5, so that the latter is driven only when the clutch is engaged.

The axial dimensions of the driving and driven elements of the clutch are such that their hubs are closely contiguous to one another with only a running clearance between their adjacent ends.

As is customary in helical spring clutches, a helical spring 16 encircles the hubs of the driving and driven elements; and to enable the spring to have as many coils as the available space will allow, its axial dimension or length is only slightly less than the distance between the shoulders 17 and 18 formed respectively by the underside of the flange 9 on the driving element and the upper ends of the threads of the worm 13 on the driven element. The endmost coils of the spring are thus closely contiguous to the shoulders 17 and 18.

Torque transmitting engagement of the spring with the driven hub is produced by applying a rotation restraining force to a control sleeve 19 that encircles the spring and has the endmost one of the coils surrounding the driven hub connected thereto. That rotation restraining or braking force can be applied to the control sleeve in any suitable way—as by stopping rotation of a control spring 20 that encircles the sleeve with a fairly tight frictional grip and, in the absence of a restraining force, rotates with the sleeve. One way of stopping rotation of the spring is by moving a blocking member 21 into the path of a radially outwardly directed tang 22 on the trailing end of the spring, which of course rotates with the spring and the driving hub until it collides with the blocking member. Upon such collision, the now stationary control spring restrains rotation of the sleeve which, in turn causes the clutch spring 16 to contract or wrap itself down onto the driven hub.

As thus far described, the clutch is quite conventional and, as such, was found to be objectionably unreliable because of its failure to disengage in response to withdrawal of the blocking member 21 from the path of the tang 22. Discovery of why the clutch would not disengage was most elusive. Eventually it was found that the spring was being forced against the shoulder 18 on the driven element and, in fact, became wedged between that shoulder and the adjacent end of the sleeve. As such, disengagement of the spring from the driven hub was at best problematical. The cause of that objectionable consequence was no doubt the result of the tendency of the spring to creep around the driving hub, which—because of the helical orientation of the interface between the spring and this hub—was translated into an axial force acting on the spring in the direction towards the shoulder 18.

To eliminate the tendency of the spring to screw itself towards the driven hub, a tang 24 projecting axially from the end of the spring adjacent to the shoulder 17 was inserted into an axially oriented hole 25 in the flange 9, and—to prevent any possibility that the other endmost coil of the spring could be forced against the shoulder 18 or wedged between that shoulder and the adjacent end of the sleeve—a radially outwardly oriented tang 26 on the end of the spring is snugly received in a correspondingly oriented hole 27 through the wall of the sleeve.

With these two changes in the structure of the conventional helical spring clutch, some improvement in reliability of clutch disengagement was achieved, but fully satisfactory results were not attained until the outer end portion 28 of the driving hub, wich is adjacent to the driven hub, was reduced in diameter. The most effective axial dimension for that reduced diameter end portion 28 was found to be not less than the axial dimension of one turn and not more than the collective axial dimension of three turns of the spring, and its most effective diameter was that of the driven hub or just slightly less than that. It was also found that the step in the diameter of the driving hub should be gradual. With this reduction in the diameter of the lower end of the driving hub, disengagement of the clutch was not only reliable but also much quicker.

Apparently the shape-restoring force inherent in the coils of the spring adjacent to the gap between the driving and driven hubs is augmented by the contraction of those coils when the clutch is engaged. In any event, the spring promptly disengages itself from the driven hub when the rotation restraining force on the control sleeve is removed; and, by the elimination of the possibility of the endmost one of the coils of the spring that encircle the driven hub to wedge itself between the end of the sleeve and the adjacent shoulder 18, complete satisfaction in the performance of the clutch has been achieved.

Those skilled in the art will appreciate that the invention can be embodied in forms other than as herein disclosed for purposes of illustration.

The invention is defined by the following claims:

I claim:

1. In a helical spring-type clutch wherein coaxial driving and driven elements have axially contiguous hubs, each of which projects from a shoulder integral therewith, wherein a helical spring encircling both hubs has its endmost coils adjacent to the shoulders on the driving and driven elements and has coils that grip the hub of the driving element and coils that normally do not contact the hub of the driven element but are grippingly engageable therewith upon contraction of said coils, and wherein a control sleeve encircling the helical spring rotates with the driving element when unrestrained but when restrained against free rotation causes the coils of the spring to contract and tightly grip both hubs and thereby effect engagement of the clutch, the improvement which assures prompt disengagement of the clutch upon removal of the rotation restraining force from the control sleeve and which improvement comprises the combination of:

A. a radially outwardly projecting tang on the endmost of the coils of the spring that encircle the hub of the driven element, snugly received in a radially oriented hole in the control sleeve, so that said endmost coil of the spring is not only held against angular displacement with respect to the control sleeve to assure contraction of the spring into torque transmitting gripping engagement with both hubs when the control sleeve is restrained against free rotation with the driving element, but is also prevented from contacting the adjacent shoulder on the driven element;

B. a tang projecting axially from the endmost of the coils of the spring that encircle the hub of the driving element, snugly received in an axially oriented hole in the adjacent shoulder on the driving element to prevent relative rotation between the spring and the hub of the driving element and the consequent tendency for the spring to creep towards the driven element; and C. the diameter of the outer end portion of the hub on the driving element adjacent to the hub of the driven element being equal to or slightly less than the diameter of the hub of the driven element, and the diameter of the hub portion of the driving element adjacent to the shoulder thereof being greater than the diameter of said outer end portion of the driving element, the spring having coils in engagement with both of said portions of the hub of the driving element when the clutch is engaged, so that the force with which the coils of the spring encircling the contiguous end portions of the hubs grip the same is increased during engagement of the clutch and the shape-restoring force in the spring is augmented and rendered more effective to disengage the spring from the driven element upon removal of the restraint against rotation of the control sleeve.

2. The helical spring-type clutch of claim 1, wherein the axial length of the reduced diameter end portion of the hub on the driving element is substantially not less than the axial dimension of one turn and not greater than the collective axial dimension of three turns of the spring.

* * * * *